US009324237B2

(12) United States Patent
Grabow et al.

(10) Patent No.: US 9,324,237 B2
(45) Date of Patent: Apr. 26, 2016

(54) METHOD AND SYSTEM FOR CALCULATING AIRCRAFT SPEED CHANGES

(71) Applicant: The Boeing Company, Chicago, IL (US)

(72) Inventors: Christian Grabow, Madrid (ES); Lars Fucke, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/471,375

(22) Filed: Aug. 28, 2014

(65) Prior Publication Data
US 2015/0066254 A1 Mar. 5, 2015

(30) Foreign Application Priority Data

Sep. 4, 2013 (EP) .................................... 13382345

(51) Int. Cl.
G08G 5/00 (2006.01)
G08G 5/04 (2006.01)
(Continued)

(52) U.S. Cl.
CPC .............. *G08G 5/0017* (2013.01); *G05D 1/104* (2013.01); *G08G 5/0021* (2013.01); *G08G 5/0026* (2013.01); *G08G 5/0078* (2013.01); *G08G 5/0082* (2013.01); *G08G 5/025* (2013.01); *G08G 5/04* (2013.01)

(58) Field of Classification Search
CPC ... G08G 5/0017; G08G 5/0082; G08G 5/025; G08G 5/0078; G08G 5/0026; G08G 5/0021; G08G 5/04; G05D 1/0607; G05D 1/104; G05D 1/0676; G05D 1/00

USPC ............................................................ 701/14
See application file for complete search history.

(56) References Cited

U.S. PATENT DOCUMENTS

2012/0209457 A1\* 8/2012 Bushnell .......................... 701/13

FOREIGN PATENT DOCUMENTS

FR 2968440 A1 6/2012

OTHER PUBLICATIONS

Clarke, et al., "Development, design and flight test evaluation of a continuous descent approach procedure for nighttime operation at Louisville International Airport," PARTNER Report No. PARTNER-COE-2005-002, Jan. 9, 2006, 96 pages.

(Continued)

*Primary Examiner* — Rodney Butler
*Assistant Examiner* — Anne Mazzara
(74) *Attorney, Agent, or Firm* — Yee & Associates, P.C.

(57) ABSTRACT

Methods and systems for determining a change of speed of an aircraft for enabling the avoidance of conflicts between aircraft trajectories. The method of determining a change in speed of an aircraft, comprises the steps of: defining a merge point and a tie point; monitoring a first aircraft; determining when the first aircraft passes the tie point; providing trajectory data; predicting a trajectory of a second aircraft using the trajectory data; defining a minimum permissible longitudinal spacing; predicting a longitudinal spacing between the first and second aircraft at the merge point based on the predicted trajectory; and if the minimum permissible longitudinal spacing is greater than the predicted longitudinal spacing then calculating a proposed change in speed of the second aircraft that will result in the longitudinal spacing between the first and second aircraft at the merge point being greater than or equal to the minimum permissible longitudinal spacing.

20 Claims, 4 Drawing Sheets

(51) Int. Cl.
G05D 1/00 (2006.01)
G05D 1/10 (2006.01)
G08G 5/02 (2006.01)

(56) References Cited

OTHER PUBLICATIONS

"Continuous Descent Operations (CDO) Manual," International Civil Aviation Authorization, DOC 9931, AN/476, 2010, 57 pages. Accessed Aug. 26, 2014, https://smartech.gatech.edu/bitstream/handle/1853/34380/Bonifice%202%20CDO%209931_draft_en.pdf?sequence=3.

White, "Continuous Descent Operations (CDO) in Southern California," FAA, Presentation at 2009 BRTE CDA Workshop, Oct. 8, 2009, 36 pages.

Larsson, "Green Arrivals and predictable operation—Challenges and way forward at Stockholm Arlanda," SAS Scandinavian Airlines, CAS Avionics & Flight Deck European Conference, May 19, 2010, 26 pages.

Isaacson et al., "A Concept for Robust, High Density Terminal Air Traffic Operations," 10th AIAA Aviation Technology, Integration, and Operations (ATIO) Conference, Sep. 2010, 23 pages.

European Search Report dated Mar. 14, 2014 regarding Application No. EP13382345.0, 9 pages.

* cited by examiner

METHOD AND SYSTEM FOR CALCULATING AIRCRAFT SPEED CHANGES

BACKGROUND INFORMATION

1. Priority Data

This application claims priority to European patent application number 13382345.0, filed Sep. 4, 2013, the entirety of which is hereby incorporated by reference.

2. Field

The present disclosure relates to calculating aircraft speed changes for enabling the avoidance of conflicts between aircraft trajectories.

3. Background

Conflicts in aircraft trajectories may occur, typically on approach to an airport. Improved methods and devices are sought for avoiding such conflicts.

SUMMARY

The illustrative embodiments provide for a method of determining a change in speed of an aircraft. The method includes defining a merge point and a tie point; monitoring a first aircraft; determining when the first aircraft passes the tie point; providing trajectory data; predicting a trajectory of a second aircraft using the trajectory data; defining a minimum permissible longitudinal spacing; predicting a longitudinal spacing between the first and second aircraft at the merge point based on the predicted trajectory; and if the minimum permissible longitudinal spacing is greater than the predicted longitudinal spacing then calculating a proposed change in speed of the second aircraft that will result in the longitudinal spacing between the first and second aircraft at the merge point being greater than or equal to the minimum permissible longitudinal spacing.

The illustrative embodiments provide for a system for determining a change in speed of an aircraft. The system includes monitoring means for monitoring the locations of aircraft; storage means for storing trajectory data; and a processor. The processor may be configured to: define a merge point and a tie point; monitor a first aircraft; determine when the first aircraft passes the tie point; provide trajectory data; predict a trajectory of a second aircraft using the trajectory data; define a minimum permissible longitudinal spacing; predict a longitudinal spacing between the first and second aircraft at the merge point based on the predicted trajectory; and when the minimum permissible longitudinal spacing is greater than the predicted longitudinal spacing, calculate a proposed change in speed of the second aircraft that will result in the longitudinal spacing between the first and second aircraft at the merge point being greater than or equal to the minimum permissible longitudinal spacing.

The illustrative embodiments provide for a display device for an aircraft or an air traffic control system. The display device is arranged to indicate: a position of a first aircraft; a predicted track (300) of a second aircraft (310); and one or more speed advisories (345, 365) showing a plurality of speed change options corresponding to points on the predicted track(s) (300) of the second aircraft (310).

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
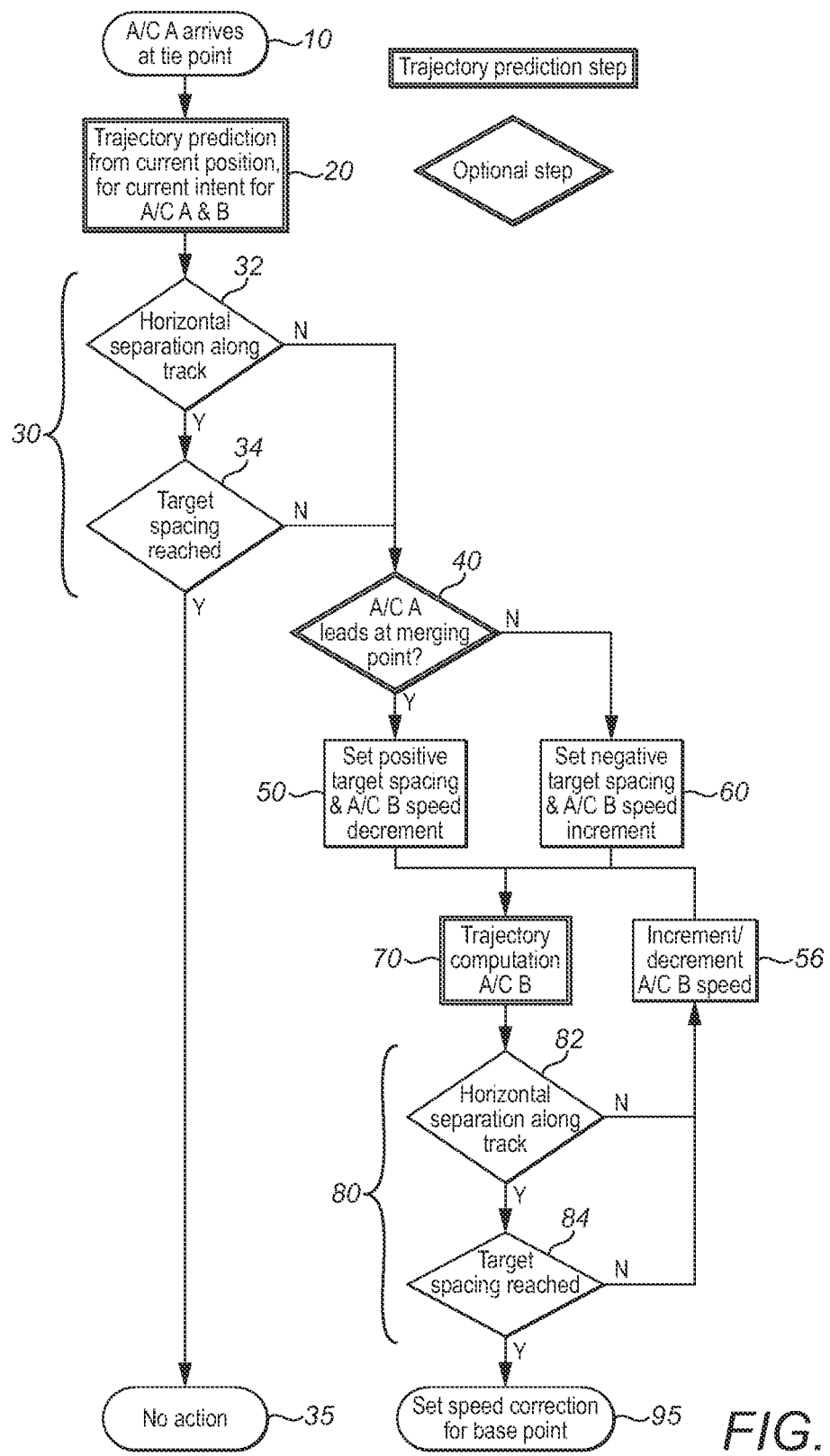
FIG. 1 shows a flow chart indicating steps of a method of generating speed advice.

The illustrative embodiments relate to methods and systems for determining a change of speed of an aircraft, which may be of use in an air traffic control system. Specifically, the illustrative embodiments can provide a method of determining a change in speed of an aircraft for enabling the avoidance of conflicts between aircraft trajectories. For example, the illustrative embodiments can be used to remove conflicts between trajectories of aircraft on merging paths. A system embodying the illustrative embodiments may be a display for an air traffic controller or a pilot that graphically indicates a change in speed of an aircraft for enabling the avoidance of conflicts between aircraft trajectories.

An area in which conflicts can occur, is on an approach to an airport. Aircraft approaching an airport will merge onto the same path. The location at which the approaching paths converge is known as the "merge point". The aim of an air traffic controller is to ensure adequate spacing between aircraft as they pass the merge point and thereafter. To achieve this, it is conventional to define a "tie point" on each of the paths approaching the merge point. The tie points are located at a fixed distance from the merge point. Aircraft are instructed to maintain a predefined constant speed as they approach a tie point, and to hold a constant speed as they travel from the tie point to the merge point.

Since the aircraft hold a constant speed, it is a simple matter to prevent aircraft from being too close as they pass through the merge point. Specifically, when a first aircraft passes through a tie point, an air traffic controller will issue commands to slow down any later approaching aircraft if, on the basis of the distance to the tie point that they are approaching, their travel at a constant speed would lead them to conflict with the first aircraft. For this purpose, an air traffic controller will have a speed reduction table, such as that shown in Table 1.

TABLE 1

| Distance to Tie Point (Nautical Miles or 1.852 km) | Change in Speed (Knots or 1.852 km/h) |
|---|---|
| 6.5 | 0 |
| 5.8 | −10 |
| 5.3 | −20 |
| 4.6 | −30 |
| 3.7 | −40 |
| 2.6 | −50 |

The speed reduction table has a first column showing a plurality of distances to a tie point, and a second column showing corresponding changes in speed necessary to maintain sufficient spacing.

As can be seen from the example of Table 1, once a first aircraft has passed a tie point, an air traffic controller will determine the distance between a second aircraft (which may be the closest following aircraft), and its corresponding tie point. If this distance is greater than 6.5, then there will be no need to change the aircraft's speed and it can proceed at the predetermined speed (which will be the same as that of the first aircraft). Thus, spacing will be maintained.

If this distance is for example 5.3, then this indicates that the second aircraft will be too close to the first aircraft. Thus, the second aircraft must slow down to avoid insufficient spacing at the merge point. The speed reduction table shows the amount by which the second aircraft must travel at below the predetermined speed (in this example, −20). Thus, the second aircraft must travel from the tie point to the merge point at 20 below the predetermined speed in order that sufficient spacing will be achieved when it arrives at the merge point.

This method is simple and reliable, but is not optimal for efficient aircraft scheduling. The method can only reduce the rate at which aircraft travel through a merge point, potentially leading to congestion. The system cannot be used to increase aircraft speed, because there is no way of avoiding any forward conflicts that would arise.

According to a first aspect of the illustrative embodiments there is provided a method as defined by claim 1.

Preferably, the method further comprises: defining a minimum permissible horizontal spacing; predicting a trajectory of the first aircraft using the trajectory data; and predicting a horizontal spacing between the first and second aircraft before the merge point based on the predicted trajectory, wherein the step of calculating a proposed change in speed comprises calculating a proposed change in speed of the second aircraft that will result in the horizontal spacing between the first and second aircraft before the merge point being greater than or equal to the minimum permissible horizontal spacing.

The step of calculating a proposed change in speed may comprise: calculating a proposed nominal change in speed; predicting an updated trajectory of a second aircraft as modified by the proposed nominal change in speed; predicting a longitudinal spacing between the first and second aircraft at the merge point based on the predicted updated trajectory; modifying the proposed nominal change in speed until the longitudinal spacing between the first and second aircraft at the merge point is greater than or equal to the minimum permissible longitudinal spacing.

The step of calculating a proposed change in speed may comprise: calculating a proposed nominal change in speed; predicting an updated trajectory of a second aircraft as modified by the proposed nominal change in speed; predicting a longitudinal spacing between the first and second aircraft at the merge point based on the predicted updated trajectory; modifying the proposed nominal change in speed until the longitudinal spacing between the first and second aircraft at the merge point is greater than or equal to the minimum permissible longitudinal spacing, and the horizontal spacing between the first and second aircraft before the merge point is greater than or equal to the minimum permissible horizontal spacing.

The method may further comprise the step of transmitting to the second aircraft the proposed change of speed.

The method may further comprise the step of displaying on the second aircraft the proposed change of speed.

The method may further comprise the step of changing the speed of the second aircraft in accordance with the calculated proposed change of speed.

The step of calculating a proposed change in speed may comprise calculating a plurality of speed changes corresponding to locations along the predicted trajectory of the second aircraft.

Optionally, each of the plurality of speed changes is calculated such that if the second aircraft effects the change of speed at the corresponding location the longitudinal spacing between the first and second aircraft at the merge point will be greater than or equal to the minimum permissible longitudinal spacing.

The step of calculating a proposed change in speed may comprise determining that the change in speed allows the aircraft to remain within operational limits.

The step of calculating a proposed change in speed may comprise calculating one or both of an increase in speed and a decrease in speed.

The method may further comprise the step of updating the trajectory data in accordance with the proposed change of speed; and transmitting to the second aircraft the updated trajectory data.

The step of providing trajectory data may comprise transmitting trajectory data from the second aircraft to an air traffic control system and/or transmitting trajectory data from the second aircraft to an air traffic control system.

The step of calculating a proposed change in speed of the second aircraft may comprise: calculating a nominal speed change; determining if the nominal speed change will result in the longitudinal spacing between the first and second aircraft at the merge point being greater than or equal to the minimum permissible longitudinal spacing; repeatedly incrementing the nominal speed change until the nominal speed change will result in the longitudinal spacing between the first and second aircraft at the merge point being greater than or equal to the minimum permissible longitudinal spacing.

The step of calculating a proposed change in speed of the second aircraft may comprise: calculating a nominal speed change; determining if the nominal speed change will result in the horizontal spacing between the first and second aircraft at the merge point being greater than or equal to the minimum permissible horizontal spacing; repeatedly incrementing the nominal speed change until the nominal speed change will result in the horizontal spacing between the first and second aircraft at the merge point being greater than or equal to the minimum permissible horizontal spacing.

According to a second aspect of the illustrative embodiments there is provided a system for determining a change in speed of an aircraft, comprising: monitoring means for monitoring the locations of aircraft; storage means for storing trajectory data; a processor arranged to carry out the method of any preceding claim.

The system may further comprise means for receiving trajectory data.

The system may further comprise means for transmitting trajectory data.

The system may be an air traffic control system or an aircraft.

According to a third aspect of the illustrative embodiments there is provided a display device for an aircraft or an air traffic control system, the display device arranged to indicate: a position of a first aircraft; a predicted track (300) of a second aircraft (310); and one or more speed advisories (345, 365) showing a plurality of speed change options corresponding to points on the predicted track(s) (300) of the second aircraft (310).

The display device may be arranged to indicate a predicted track of the first aircraft.

The/each speed advisory (345, 365) may include an axis extending in parallel with the predicted track (300), and indicates the correspondence of the plurality of speed change options with locations along the axis.

The display device may comprise two speed advisories (345, 365) arranged to extend either side of each of the predicted track(s) (300) of the second aircraft (310).

For a better understanding of the illustrative embodiments and to show how the same may be put into effect, reference is now made, by way of example only, to the accompanying drawings.

In an exemplary embodiment, a method of determining a change in speed of an aircraft may be carried out on a system. In preferred embodiments, the system may be an air traffic control system, may be an onboard system of an aircraft, or may be distributed between an air traffic control system and an onboard system of an aircraft.

A merge point is defined on the path of approach to a runway. On each of the possible routes leading to the merge point a tie point may be defined.

In contrast to the prior art approach, in the exemplary embodiment, there is no need to specify that aircraft must travel at a constant speed on approach to the tie point. Furthermore, there is no need to specify that aircraft must travel at a constant speed on approach to the merge point.

With reference to FIG. 1, the method of determining a change in speed of an aircraft is triggered in step 10 when a first aircraft passes a predetermined point. Preferably, the predetermined point is a tie point.

Each aircraft has associated therewith aircraft data indicating how the aircraft is intended to be flown to the tie point and then on to the merge point. This data may be already available to the system, or may be transmitted to the system from the aircraft. In some embodiments, this data may be transmitted to the system from the aircraft on request. Aircraft data may represent "aircraft intent" as defined in WO2009/042405, the disclosure of which is fully incorporated herein by reference.

In step 20, the system may obtain aircraft data associated with the first aircraft, and may obtain aircraft data associated with at least one second aircraft.

The system may then predict the trajectory of the first aircraft using the aircraft data associated therewith, and predict the trajectory of the second aircraft using the aircraft data associated therewith.

In step 32, the system may optionally determine from the predicted trajectories whether the aircraft are horizontally separated along their entire paths from tie point to merge point. This is beneficial when the trajectory prediction indicates that the second aircraft will overtake the first aircraft before the merge point.

If in step 32, the system predicts that the first aircraft and the second aircraft will not be adequately horizontally spaced up to the merge point (for example, along the entire path from tie point to merge point), then the method moves on to step 40.

If in step 32, the system predicts that the first aircraft and the second aircraft will be adequately horizontally spaced up to the merge point, then the method moves on to step 34.

In step 34, the system may predict whether the first aircraft and the second aircraft will be adequately longitudinally spaced near the merge point using the predicted trajectory of the first aircraft and the predicted trajectory of the second aircraft.

The phrase "near the merge point" in this context means that the aircraft spacing may be assessed as the first aircraft passes the merge point, or as the second aircraft passes the merge point, at some point in between, or at some substantially similar position.

In doing this, the system may process the trajectory of the first aircraft and the trajectory of the second aircraft to estimate what the spacing between the aircraft will be near the merge point.

The longitudinal spacing may be the distance between the first and the second aircraft along the predicted trajectory of the second aircraft when the first aircraft is near the merge point. The predicted trajectory may be represented as a two-dimensional track. In that case, the longitudinal spacing would be the distance the second aircraft must travel along the track to reach the merge point. If the second aircraft overtakes the first aircraft before the merge point, then the longitudinal spacing is the distance between the first and the second aircraft along the predicted trajectory of the first aircraft.

The system may determine that aircraft are adequately longitudinally spaced if the longitudinal distance between them is greater than a threshold longitudinal spacing. Although in preferred embodiments the threshold spacing is fixed irrespective of the type of aircraft, the threshold spacing may be a different value for different models of the first aircraft, or may be a different value for the combination of the first and second aircraft. In such embodiments, the type of aircraft may be encoded in the aircraft data.

The horizontal spacing between aircraft may be defined as the geodetic distance between the first aircraft and the second aircraft. For example, this may be measured along an imaginary line connecting the centers of gravity of the two airplanes.

In other words, the longitudinal spacing may be the along-track distance between the aircraft, while the horizontal spacing may be the distance between the aircraft resulting from a difference in longitude and latitude (irrespective of any difference in height).

The system may determine that aircraft are adequately horizontally spaced if the distance between them is greater than a threshold horizontal spacing.

If in step 34, the system predicts that the first aircraft and the second aircraft will be adequately spaced near the merge point, then the method moves on to step 35.

In step 35, the system determines that no speed instruction is required. Optionally, this may be displayed to an air traffic controller, or a pilot, or both. Alternatively, any display may remain unchanged.

If in step 34, the system predicts that the first aircraft and the second aircraft will not be adequately longitudinally spaced near the merge point, then the method moves on to step 40.

In step 40, the system may predict whether the first aircraft will still be ahead of the second aircraft at the merge point using the predicted trajectory of the first aircraft and the predicted trajectory of the second aircraft.

If the first aircraft is predicted to be ahead of the second aircraft at the merge point, the method proceeds to step 50.

If the first aircraft is not predicted to be ahead of the second aircraft at the merge point, the method proceeds to step 60.

In step 50, the system calculates a reduction in the speed of the second aircraft that would result in there being adequate spacing between the first aircraft and the second aircraft near the merge point.

In step 60, the system calculates an increase in the speed of the second aircraft that would result in there being adequate spacing between the first aircraft and the second aircraft at the merge point.

After a nominal change (increase or decrease) in speed is calculated in either step 50 or step 60, step 70 is carried out. In step 70, the computation of the predicted trajectory of the second aircraft is repeated based on the trajectory data as modified by the proposed change (increase or decrease) in speed calculated in either step 50 or step 60.

Once the modified predicted trajectory is calculated, step 82 optionally repeats the determining of horizontal spacing described above with respect to step 32.

In step 84 the determining of longitudinal separation described above with respect to step 34 is repeated.

If in either step 82 or step 84, the longitudinal or horizontal spacing is insufficient then the system proceeds to step 56.

In step 56 the speed change is increased in magnitude by a small amount. That is, a nominal decrease calculated in step 50 or a nominal increase calculated in step 60 is made larger by a predetermined amount. The system then repeats step 70. Thus, the system iteratively refines the nominal speed change.

If in either step 82 or step 84, the longitudinal or horizontal spacing is sufficient then the system proceeds to step 95.

In step 95, the system has confirmed that the speed change is appropriate for safely altering the predicted trajectory of the second aircraft. Therefore, the system may optionally generate a speed increase instruction. Optionally, this may be displayed to an air traffic controller, or a pilot, or both.

The change (either reduction or increase) in speed of the second aircraft may be calculated relative to the predicted trajectory of the second aircraft (for example, as an absolute change in speed, or as a percentage change in speed).

In the method described above, steps 35 and 95 each have the option of displaying a speed instruction (i.e., a speed reduction instruction, a speed increase instruction, or a speed unchanged instruction). However, embodiments are envisaged in which the change in speed is automatically instructed.

That is, where the system is an air traffic control system, an instruction may be transmitted in step 95 from the air traffic control system to the aircraft to effect the generated speed instruction. The second aircraft may receive the generated speed instruction and thereby modify the aircraft data in accordance with the generated speed reduction instruction or the generated speed increase instruction.

The aircraft may thereafter be flown in accordance with the modified aircraft data.

Although it is not necessary to transmit a speed unchanged instruction, it may be preferable to do so in order to unambiguously indicate that the presently predicted trajectory does not conflict.

Figure 2:
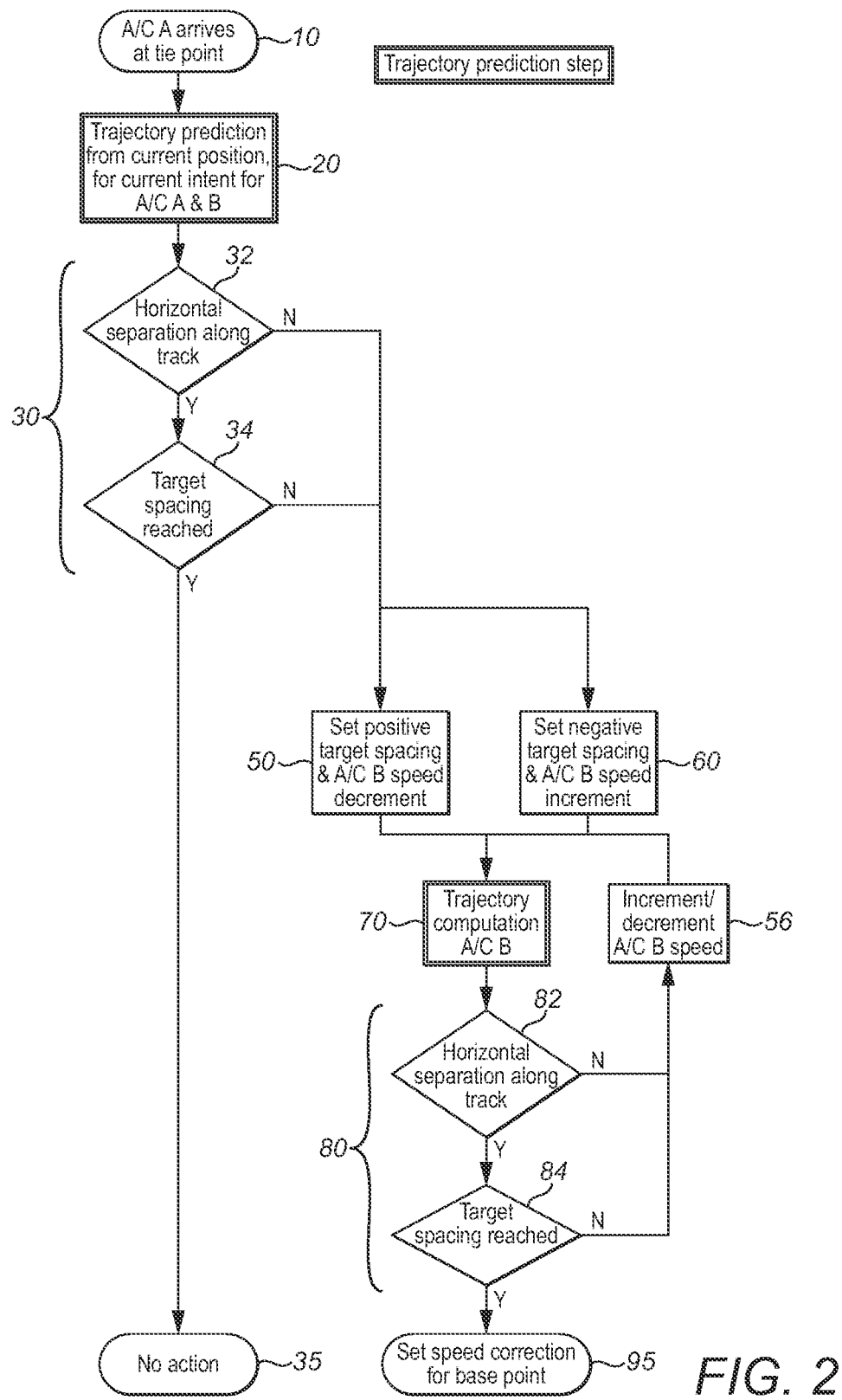
FIG. 2 shows a flow chart indicating steps of an alternative method of generating speed advice.

Whereas in the embodiment set out above the speed increase instruction is only generated if the system predicts from the aircraft data that the second aircraft will overtake the first aircraft, embodiments are envisaged in which both a speed increase and a speed decrease are always calculated as shown in FIG. 2.

When using the method of FIG. 2, when both a speed reduction and a speed increase is generated, the system may present the two instructions as options for the air traffic controller or pilot to choose. Alternatively, the system may have a user-defined setting to default to one of the two options (e.g. it may always select a speed increase or always select a speed reduction or select which options are to be displayed based on the operational capabilities of the airplane to be instructed).

The methods of FIG. 1 or FIG. 2 may further include the step of confirming that any calculated speed change would result in the speed of the second aircraft remaining between operation limits. If the calculated speed change would result in the speed of the second aircraft falling outside operation limits, then no speed change instruction is generated.

In step 95, the system may generate a speed increase instruction. The speed increase instruction may be automatically used to alter the second aircraft's trajectory. For example, if the second aircraft is flown in accordance with stored aircraft data (stored either on the aircraft or remotely therefrom), this stored aircraft data may be modified in accordance with the speed change instruction.

In many scenarios, in particular in civil aviation, such automation may be undesirable. In which case, it may be preferable for the instruction to be indicated to a pilot for consideration. Alternatively, a human air traffic controller may communicate the appropriate instruction to the pilot.

However, owing to the delay caused if a human air traffic controller issues the command and/or a pilot carries out the speed change, it may take too long for efficient operation of the second aircraft to carry out the instruction; it is possible that any delay could lead to the speed change being ineffective if the second aircraft has progressed further along its trajectory by the time the command is carried out.

To allow a human user (a pilot or an air traffic controller) to utilise an appropriate instruction, a plurality of speed change instructions may be calculated. Each of the plurality of speed change instructions can indicate a change of speed for the second aircraft at a plurality of locations along its trajectory. That is, each of the plurality of speed change instructions if effected at its corresponding location can result in the longitudinal spacing being greater than a threshold longitudinal spacing (and, in some embodiments, can result in the horizontal spacing being greater than a threshold horizontal spacing).

The plurality of speed change instructions can be displayed to the human user. Advantageously, a display may be provided indicating: the position of the second aircraft; the path of the second aircraft; and a plurality of speed change instructions at corresponding locations along the indicated path.

Figure 3:
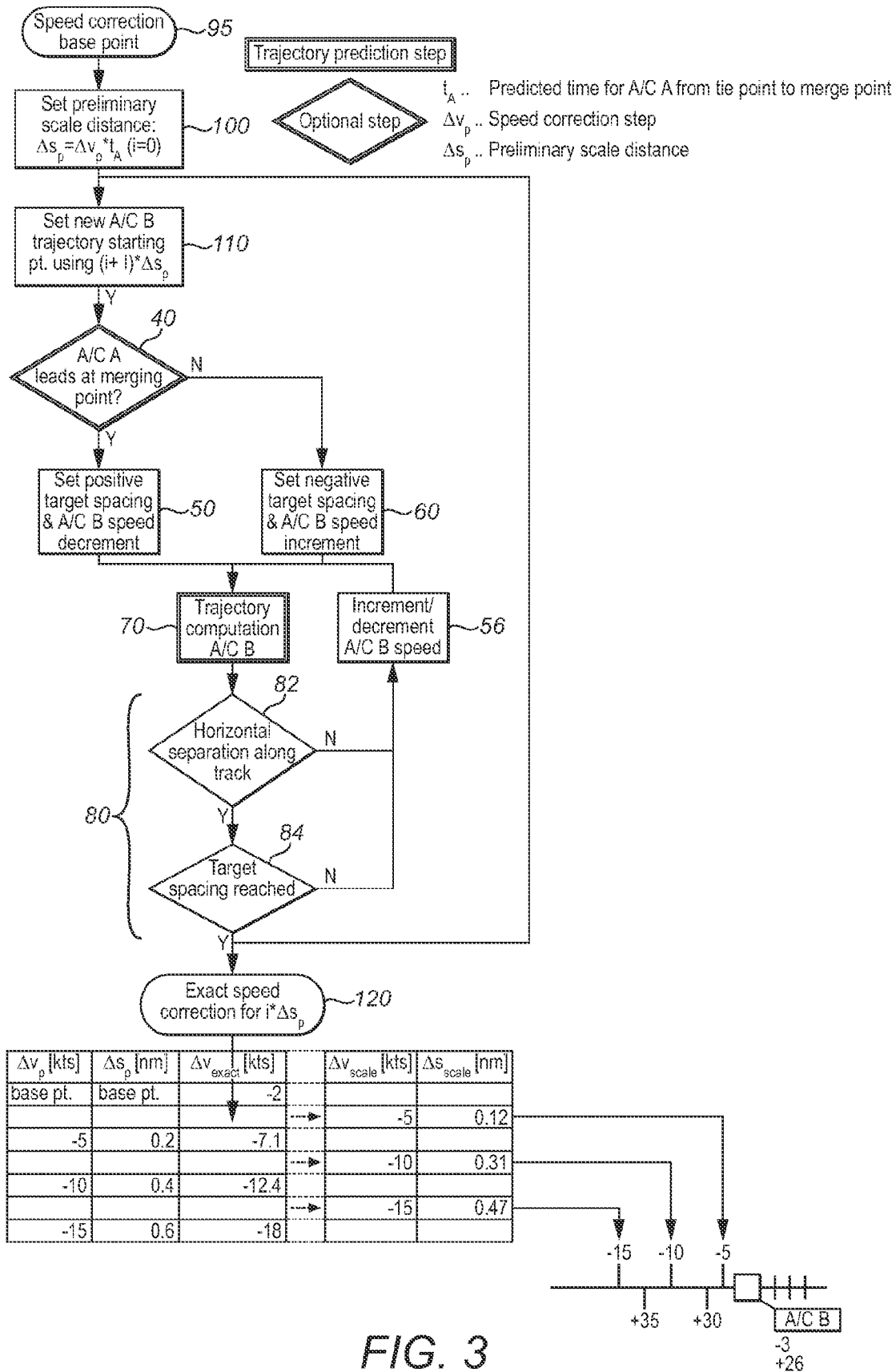
FIG. 3 shows a flow chart for generating a plurality of speed changes.

FIG. 3 shows a flow chart indicating how a plurality of speed change instructions may be determined.

As can be seen in FIG. 3, the system repeats a method comprising steps 40, 50, 60, 70, 82, 84, and 56, for each of a plurality of locations along the predicted trajectory of the second aircraft.

As shown, the method may start from step 95, explained above, in which a speed change instruction suitable for immediate (or near immediate) use has been calculated. However, the calculation of an immediately suitable speed change instruction is optional and the method may start with step 100.

In step 100, the system may determine a step distance between subsequent locations along the predicted trajectory of the second aircraft. In preferred embodiments, a suitable step distance may be calculated by multiplying the time predicted for the first aircraft to travel between its tie point and the merge point by the speed change calculated by the method of FIG. 1 or 2 (i.e., that generated in step 95).

In step 110, the system determines a first location along the predicted trajectory of the second aircraft.

The system then calculates a speed change instruction which can be carried out by the second aircraft when it reaches the first location. It may do this by carrying out step 40, then step 50 and/or step 60, then steps 70, 82, and 84 and, if required, step 56, as set out above with respect to FIG. 1 or 2.

The system may then return to step 110 and determine a second location along the predicted trajectory of the second aircraft. The second location may be located as a location spaced along the predicted trajectory of the second aircraft from the first location by the step distance.

A suitable speed change instruction can then be calculated for the second location.

The system may then return to step 110 and determine a speed change for one or more subsequent location(s). This process can be repeated until a predetermined number of speed changes for corresponding locations have been calculated.

The system then proceeds to step 120. In step 120, the system may display to the human user the plurality of speed change instructions. This may be done with the display of FIG. 4 described in detail below.

Alternatively, in step 120, rather than displaying a speed change instruction for each of a plurality of equally spaced corresponding locations, it may be preferred to display a location for each of a plurality of equally spaced corresponding speed changes.

Such a range of locations may be calculated using known methods, for example, by linear interpolation.

Figure 4:
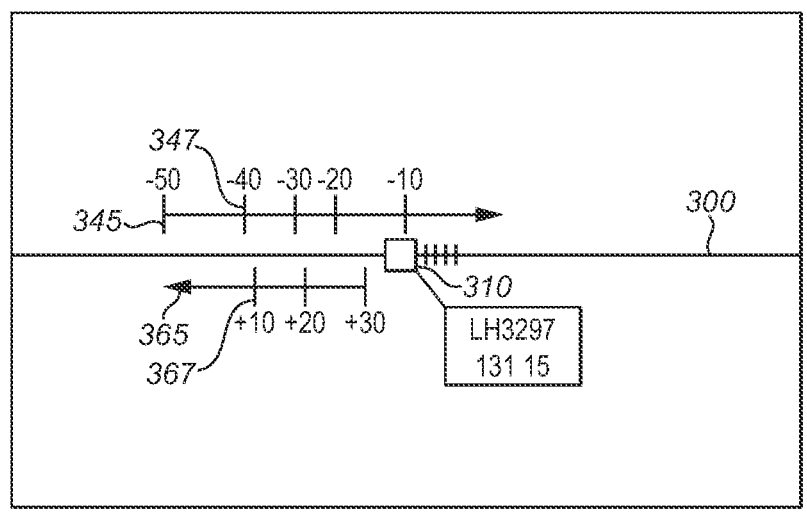
FIG. 4 shows an embodiment of a display.

FIG. 4 shows a preferred embodiment of a display for use by an air traffic controller. Such a display can provide the air traffic controller with information for instructing pilots to increase or decrease the speed of their aircraft as they approach a merge point.

An air traffic control system may include a display that graphically indicates one or more predicted tracks 300 predicted from the aircraft data associated with one or more aircraft. The display may graphically indicate any positions of interest. For example, the predicted track of a first aircraft would be indicated as passing through a tie point and a merge point.

The display may indicate position of one or more aircraft along their respective predicted tracks 300.

In preferred embodiments of a display, when the first aircraft reaches a tie point, the display may indicate a speed advisory 345, 365 for one or more second aircraft 310.

The display may indicate: the position of one or more second aircraft 310; the predicted track 300 of the second aircraft 310; and one or two speed advisories 345, 365.

Preferably, the speed advisory 345, 365 may include an axis extending in parallel with the predicted track 300 so that a point along the axis corresponds with a location on the predetermined track 300.

The speed advisory 345, 365 may indicate speed change options 347, 367 available to the second aircraft 310 for a plurality of points along the axis, such that the speed change options 347, 367 are available at the corresponding points along the predicted track 300. There may be a speed reduction advisory 345 and/or a speed increase advisory 365.

Preferably, a plurality of speed change options 347, 367 are shown on the/each speed advisory 345, 365. Preferably, the plurality of speed change options 347, 367 correspond to speed changes that are equally spaced in terms of the magnitude of the corresponding change in speed (for example +2, +4, +6 meters per second). Alternatively, the plurality of speed change options 347, 367 correspond to locations that are equally spaced in terms of distance along the predicted track (for example +500, +1000, +1500 meters).

Thus, as the first aircraft passes a tie point, the air traffic controller is able to quickly assess the speed change options 347, 367 available to the second aircraft 310 by equating the position of the aircraft 310 along the predicted track 300 with the corresponding positions of the speed change options 347, 367 along the axis of the speed change advisory 345, 365.

Advantageously, the display can be updated in real-time as prevailing conditions change to continually update the predicted tracks 300, the one or more speed change advisory 345, 365, and the position of the aircraft 310.

The above method is generally described with reference to a single second aircraft. However, it is possible that there may be more than one second aircraft. The method set out above can be applied to any second aircraft, or following aircraft, as each passes a tie point.

What is claimed is:

1. A method of determining a change in speed of an aircraft, comprising the steps of:
    defining a merge point and a tie point;
    determining when a first aircraft passes the tie point;
    predicting a trajectory of a second aircraft using trajectory data to form a predicted trajectory;
    defining a minimum permissible longitudinal spacing between the first aircraft and the second aircraft;
    predicting a longitudinal spacing between the first and second aircraft at the merge point based on the predicted trajectory to form a predicted longitudinal spacing;
    responsive to the minimum permissible longitudinal spacing being greater than the predicted longitudinal spacing, calculating a proposed change in speed of the second aircraft that will result in the longitudinal spacing between the first and second aircraft at the merge point being greater than or equal to the minimum permissible longitudinal spacing; and
    changing a speed of the second aircraft to achieve the longitudinal spacing.

2. The method of claim 1, further comprising:
    defining a minimum permissible horizontal spacing;
    predicting a trajectory of the first aircraft using the trajectory data; and
    predicting a horizontal spacing between the first and second aircraft before the merge point based on the predicted trajectory,
    wherein the step of calculating a proposed change in speed comprises calculating a proposed change in speed of the second aircraft that will result in the horizontal spacing between the first and second aircraft before the merge point being greater than or equal to the minimum permissible horizontal spacing.

3. The method of claim 2, wherein the step of calculating a proposed change in speed comprises:
    calculating a proposed nominal change in speed;
    predicting an updated trajectory of a second aircraft as modified by the proposed nominal change in speed;
    predicting a longitudinal spacing between the first and second aircraft at the merge point based on the predicted updated trajectory;
    modifying the proposed nominal change in speed until the longitudinal spacing between the first and second aircraft at the merge point is greater than or equal to the minimum permissible longitudinal spacing, and the horizontal spacing between the first and second aircraft before the merge point is greater than or equal to the minimum permissible horizontal spacing.

4. The method of claim 1, wherein the step of calculating a proposed change in speed comprises:
    calculating a proposed nominal change in speed;
    predicting an updated trajectory of a second aircraft as modified by the proposed nominal change in speed;
    predicting a longitudinal spacing between the first and second aircraft at the merge point based on the predicted updated trajectory;
    modifying the proposed nominal change in speed until the longitudinal spacing between the first and second aircraft at the merge point is greater than or equal to the minimum permissible longitudinal spacing.

5. The method of claim 1, further comprising the step of transmitting to the second aircraft the proposed change of speed.

6. The method of claim 1, further comprising the step of displaying on the second aircraft the proposed change of speed.

7. The method of claim 1, further comprising the step of changing the speed of the second aircraft in accordance with the calculated proposed change of speed.

8. The method of claim 1, wherein the step of calculating a proposed change in speed comprises calculating a plurality of speed changes corresponding to locations along the predicted trajectory of the second aircraft.

9. The method of claim 1, wherein calculating a proposed change in speed comprises determining that the change in speed allows the aircraft to remain within operational limits.

10. The method of claim 1 further comprising:
monitoring the first aircraft.

11. The method of claim 1 further comprising:
providing the trajectory data.

12. The method of claim 1 further comprising:
implementing the proposed change of speed of the second aircraft.

13. The method of claim 1, wherein the tie point comprises a point that is a fixed distance from the merge point.

14. A system for determining a change in speed of an aircraft, comprising:
monitoring means for monitoring locations of aircraft;
storage means for storing trajectory data;
a processor configured to:
define a merge point and a tie point;
determine when a first aircraft passes the tie point;
predict a trajectory of a second aircraft using trajectory data to form a predicted trajectory;
define a minimum permissible longitudinal spacing between the first aircraft and the second aircraft;
predict a longitudinal spacing between the first and second aircraft at the merge point based on the predicted trajectory to form a predicted longitudinal spacing; and
responsive to the minimum permissible longitudinal spacing being greater than the predicted longitudinal spacing, calculate a proposed change in speed of the second aircraft that will result in the longitudinal spacing between the first and second aircraft at the merge point being greater than or equal to the minimum permissible longitudinal spacing.

15. The system of claim 14, wherein the processor is further configured to monitor a first aircraft.

16. The system of claim 14, wherein the processor is further configured to provide the trajectory data.

17. The system of claim 14, wherein the processor is further configured to:
order the second aircraft to implement the proposed change of speed of the second aircraft.

18. The system of claim 14, wherein the processor, in being configured to calculate a proposed change in speed, is further configured to:
calculate a proposed nominal change in speed;
predict an updated trajectory of a second aircraft as modified by the proposed nominal change in speed to form a predicted updated trajectory;
predict a longitudinal spacing between the first and second aircraft at the merge point based on the predicted updated trajectory; and
modify the proposed nominal change in speed until the longitudinal spacing between the first and second aircraft at the merge point is greater than or equal to the minimum permissible longitudinal spacing.

19. A display device for an aircraft or an air traffic control system, the display device arranged to indicate:
a position of a first aircraft;
a predicted track (300) of a second aircraft (310); and
one or more speed advisories (345, 365) showing a plurality of speed change options corresponding to points on the predicted track(s) (300) of the second aircraft (310), wherein the one or more speed advisories (345, 365) include an axis extending in parallel with the predicted track (300), and indicates the correspondence of the plurality of speed change options with locations along the axis.

20. A display device for an aircraft or an air traffic control system, the display device arranged to indicate:
a position of a first aircraft;
a predicted track (300) of a second aircraft (310); and
one or more speed advisories (345, 365) showing a plurality of speed change options corresponding to points on the predicted track(s) (300) of the second aircraft (310), wherein the one or more speed advisories comprise two speed advisories arranged to extend to either side of the predicted track of the second aircraft.

* * * * *